United States Patent [19]

Matsuda et al.

[11] Patent Number: 4,651,844
[45] Date of Patent: Mar. 24, 1987

[54] MOTORCYCLE HAVING STEERED FRONT AND REAR WHEELS

[75] Inventors: Atsushi Matsuda, Iwata; Tashiyuki Sata, Fukuroi, both of Japan

[73] Assignee: Yamaha Hatsudoki Kabushiki Kaisha, Iwata, Japan

[21] Appl. No.: 814,650

[22] Filed: Dec. 30, 1985

[30] Foreign Application Priority Data

Dec. 31, 1984 [JP] Japan ................................. 59-278119
Dec. 31, 1984 [JP] Japan ................................. 59-278120

[51] Int. Cl.⁴ ............................................ B62K 21/00
[52] U.S. Cl. ............................................... 180/219
[58] Field of Search ............... 180/219, 220, 222, 223, 180/224, 226, 227, 140; 280/267, 269, 266, 91

[56] References Cited

U.S. PATENT DOCUMENTS

| | | | |
|---|---|---|---|
| 602,034 | 4/1898 | Murphy | 280/266 |
| 3,819,002 | 6/1974 | Heathwaite et al. | 180/227 |
| 4,157,739 | 6/1979 | Frye | 180/224 |
| 4,522,417 | 6/1985 | Sano et al. | 280/91 |

FOREIGN PATENT DOCUMENTS 1222610 2/1971 United Kingdom ............... 280/291

*Primary Examiner*—John A. Pekar
*Attorney, Agent, or Firm*—Ernest A. Beutler

[57] ABSTRACT

Steering arrangements for motorcycles wherein the rear wheel is supported for steering movement and is mechanically coupled to the mechanism for steering the front wheel so that both wheels will be steered in unison. An arrangement is provided to adjust the steering ratio between the front and rear wheels to suit riding conditions and rider preference and a caster angle is chosen to minimize effective wheelbase changes under suspension travel.

11 Claims, 9 Drawing Figures

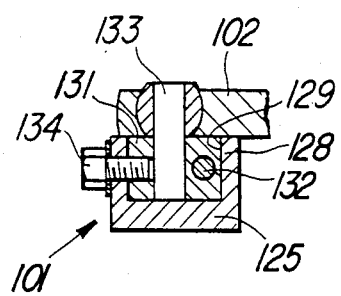
*Fig-7*
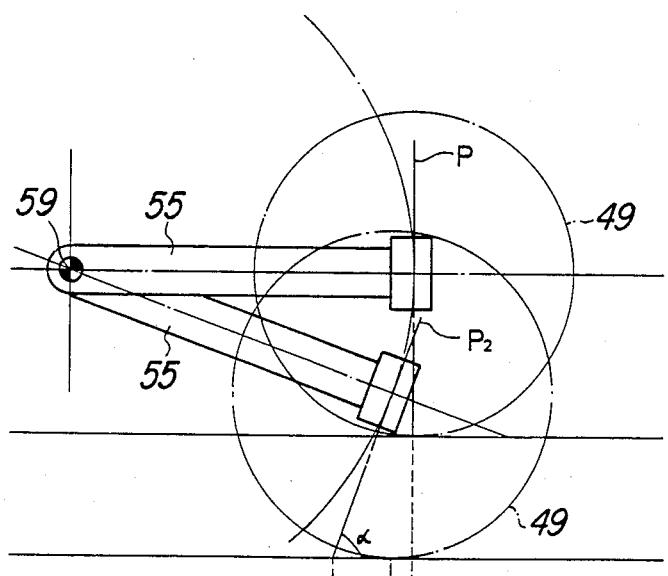
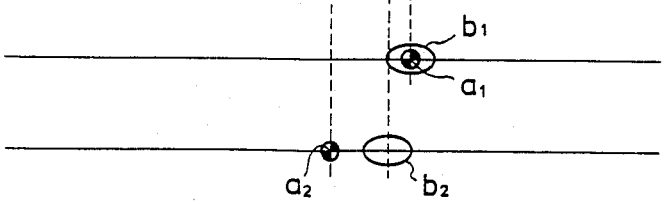
*Fig-8*

MOTORCYCLE HAVING STEERED FRONT AND REAR WHEELS

BACKGROUND OF THE INVENTION

This invention relates to a motorcycle having steered front and rear wheels and more particularly to an improved steering system for the rear wheel and an improved suspension system for it.

Recently it has been realized that the handling of a motorcycle can be significantly improved if the rear wheel is supported so that it may be steered and is mechanically coupled to the front wheel so the front and rear wheels will be steered together. The steering relationship between the front and rear wheels can be very critical to the handling. In addition, the type of terrain over which the motorcycle is being ridden, the speed of travel and a number of other factors including rider preference can necessitate changes in the steering ratio to suit cetain of these conditions.

It is, therefore, a principal object of this invention to provide an improved steering arrangement for the front and rear wheels of a vehicle.

It is another object of this invention to provide a rear wheel steering mechanism that permits adjustment in the ratio of steering between the front and rear wheels.

It is a yet further object of this invention to provide an improved and simplified arrangement for permitting adjustment in the steering ratio between the front and rear wheels of a vehicle such as a motorcycle.

One well known type of vehicle suspension system embodies the so called "trailing arm" wherein a wheel is supported for rotation about an axis that is disposed at or contiguous to one end of a suspension arm that is pivotally supported at its other end on the vehicle body. A suspension media such as springs and/or shock absorbers are interposed between the trailing arm and the vehicle body for controlling the suspension movement.

This type of suspension system is used quite widely in connection with the rear wheel of a motorcycle. When employed in connection with a motorcycle, the contact patch between the rear wheel and the ground may change relative to the contact patch of the front wheel with the ground under suspension travel. This change in dimension effectively changes the wheelbase of the motorcycle during suspension travel. Such wheelbase changes can seriously affect the handling of the motorcycle, particularly where the rear wheel is also steered, and can be undesirable.

It is, therefore, a still further object of this invention to provide an improved suspension system embodying a trailing arm and in which the wheelbase does not change significantly during suspension travel.

It is a further objection of this invention to provide an improved rear wheel suspension system for a motorcycle.

SUMMARY OF THE INVENTION

A first feature of this invention is adapted to be embodied in a vehicle having at least one dirigible front wheel steered by an operator and at least one rear wheel. In accordance with this feature of the invention, means are provided for supporting the rear wheel for steering movement and means mechanically couple the front and rear wheels for simultaneous steering movement. Means are provided for adjusting the steering relationship between the front and rear wheels.

Another feature of this invention is adapted to be embodied in a motorcycle having a single steered front wheel and a single driven rear wheel. The rear wheel is supported for suspension movement about a caster angle that minimizes effective changes in wheelbase upon suspension travel.

BRIEF DESCRIPTION OF THE DRAWINGS

FIG. 7 is a cross-sectional view taken along the line 7—7 in FIG. 6.

FIG. 8 is a partially schematic view showing the suspension travel of the rear wheel under braking.

DETAILED DESCRIPTION OF THE PREFERRED EMBODIMENT

Figure 1:
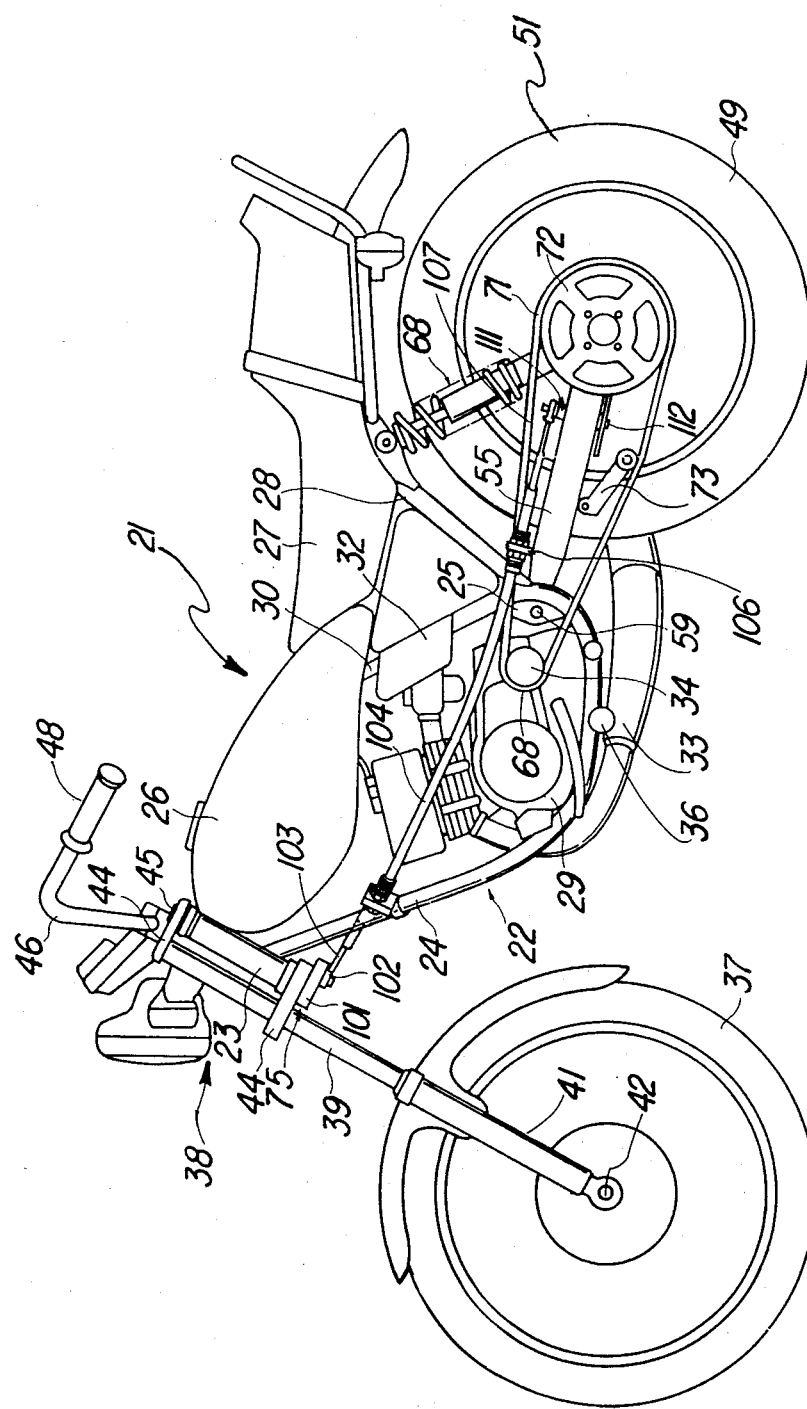
FIG. 1 is a side elevational view of a motorcycle constructed in accordance with an embodiment of the invention.
Figure 2:
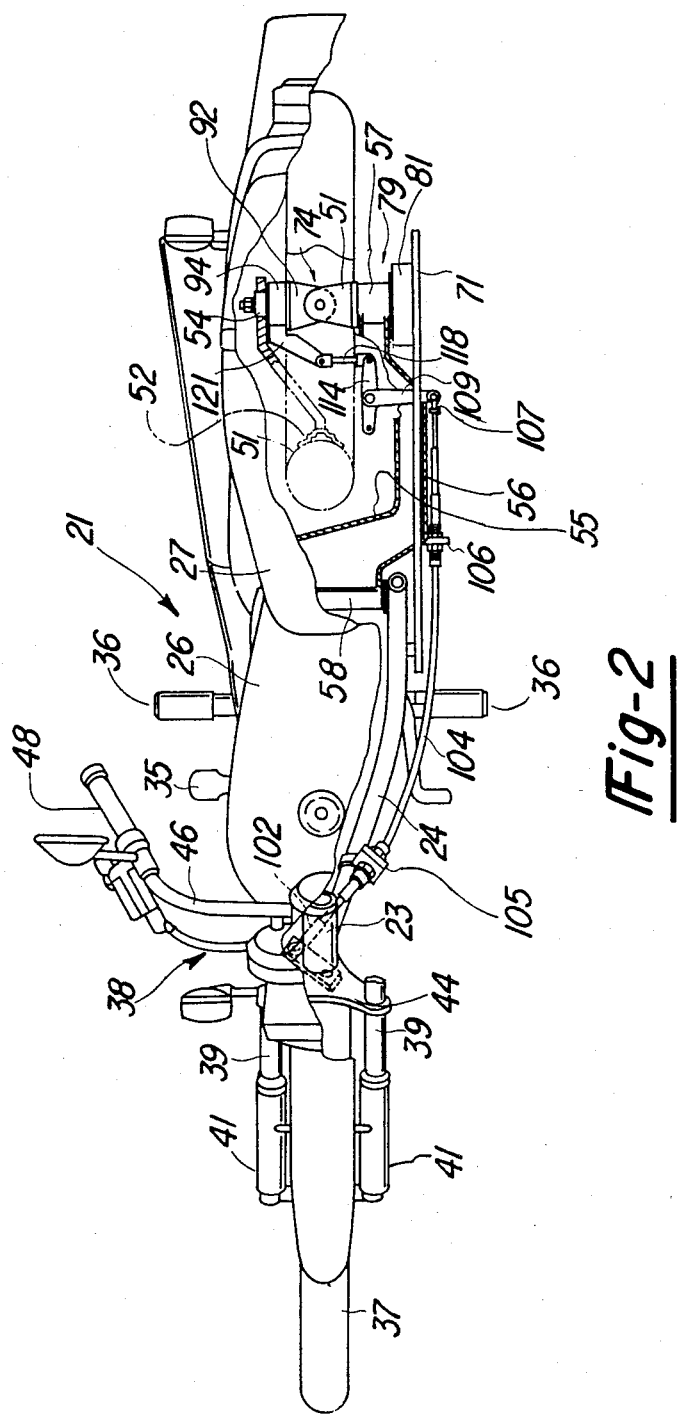
FIG. 2 is a top plan view, with portions broken away, of the motorcycle.

A motorcycle constructed in accordance with this embodiment is identified generally by the reference numeral 21. The motorcycle 21 includes a frame assembly, indicated generally by the reference numeral 22, and which may be of any known type. In the illustrated embodiment, the frame assembly 22 is depicted as being made up of a welded tubular construction including a head pipe 23, a main tube 30, a pair of down tubes 24 and brackets 25 that are affixed to the down tubes 24 and rearwardly and downwardly projecting portions of the main tube 30. A fuel tank 26 is supported on the main tube and is positioned forwardly of a seat 27 that is supported on a seat rail 19 and a seal pillar rail 28 of the frame assembly 22. Since the frame assembly per se forms no part of the invention, a further description of it is believed to be unnecessary.

An internal combustion engine, indicated generally by the reference numeral 29 is supported within the frame assembly 22 in a known manner. In the illustrated embodiment, the engine 29 is depicted as being of the reciprocating type and has one or more cylinders that receive a fuel/air charge from a carburetor 31 that is positioned rearwardly of the cylinder block and which extends in a generally horizontal direction. An air cleaner and air silencer assembly 32, which is positioned within the frame 22 rearwardly of the carburetors 31 and beneath the seat 27, supplies air to the carburetor 31. In addition, the engine 29 is provided with an exhaust system 33 for silencing the exhaust gases and discharging them to the atmosphere. The engine 29 also includes a combined crankcase, transmission assembly that drives an output shaft 34 at any of a plurality of selected speed ratios.

A foot brake pedal 35 is provided at one side of the frame 22 for braking the rear wheel in a manner to be described. In addition, a pair of foot pegs 36 are supported by the frame assembly 22 and extend outwardly from the sides thereof to afford a rest for the rider's feet.

A front wheel 37 is supported from the forward portion of the frame assembly 22 and specifically the head pipe 23 for steering and suspension movement by means of a front wheel steering assembly, indicated generally by the reference numeral 38. The front wheel steering assembly 38 includes a front fork 39 having a tubular suspension system 41 that carries the front wheel 37 for rotation about an axis 42 at its lower end. The system 41 is supported for vertical movement relative to an upper portion 43 so as to accommodate controlled suspension movement for the front wheel 37.

Upper and lower brackets 44 connect the front fork upper portion 39 to a steering shaft 45 that is journaled for rotation about a front steering axis in the head pipe 23. A handlebar assembly 46 is connected to the brackets 44 and steering shaft 45. The handlebar 46 carries hand grips 48 at its outer end. It should be readily apparent that a rider positioned on the seat 27 may steer the front wheel 37 through the hand grips 48 and handlebar 46.

The suspension movement of the front wheel 37 is about an axis that is inclined to the vertical and which is parallel to the steering axis so that the front wheel 37 contacts the ground line at a point.

A driven rear wheel assembly, indicated generally by the reference numeral 49, is carried at the rear end of the frame assembly 22 in a manner to be described. The rear wheel 49 includes a tire 51 that is mounted on a rim 52 that is connected to a hub portion 54.

It should be noted that the motorcycle 21 as thus far described is generally conventional in configuration, and for that reason, only the general construction has been described in detail.

Figure 3:
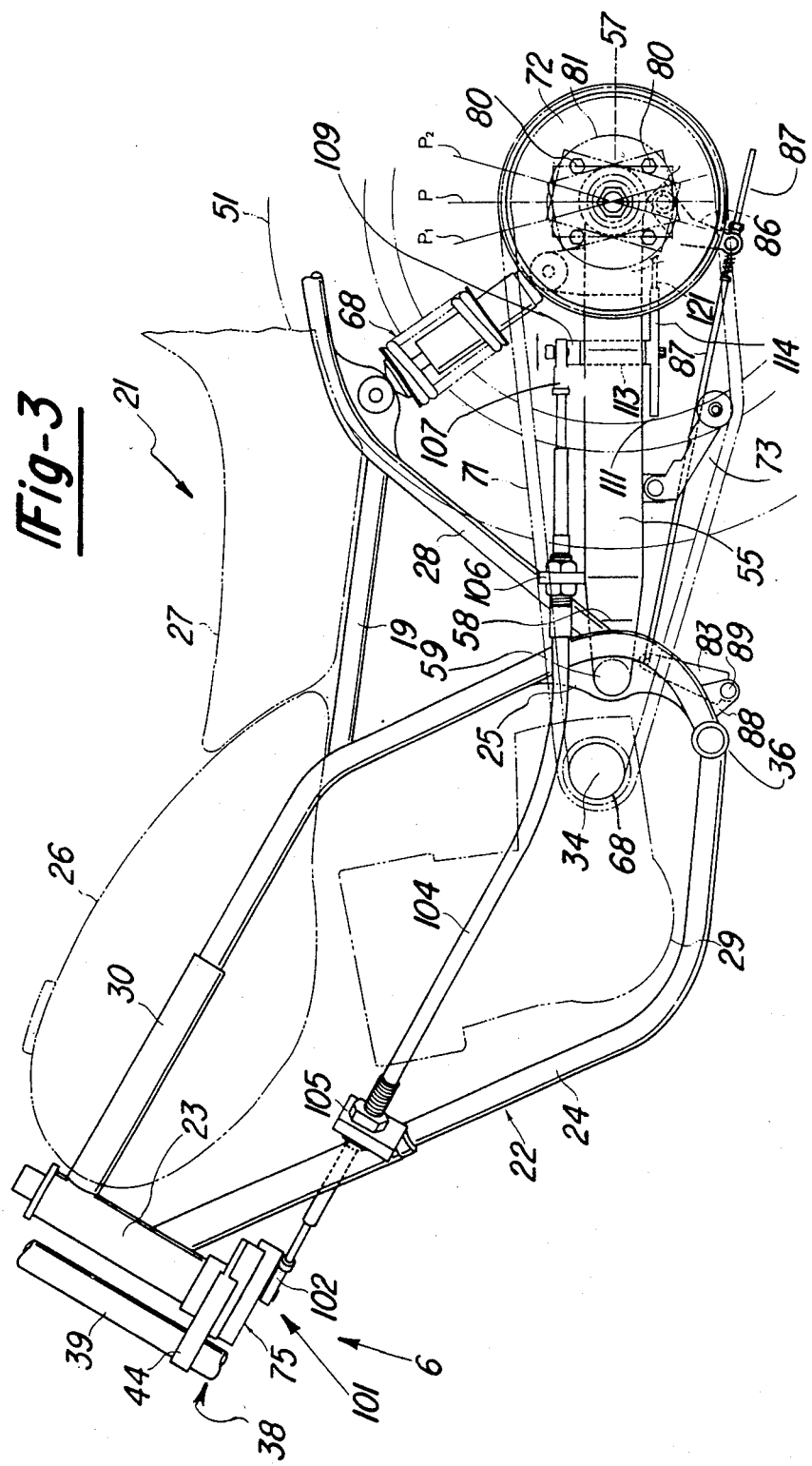
FIG. 3 is an enlarged partial side elevational view showing the frame and rear wheel suspension system as well as the interconnection between the front and rear wheel steering.
Figure 4:
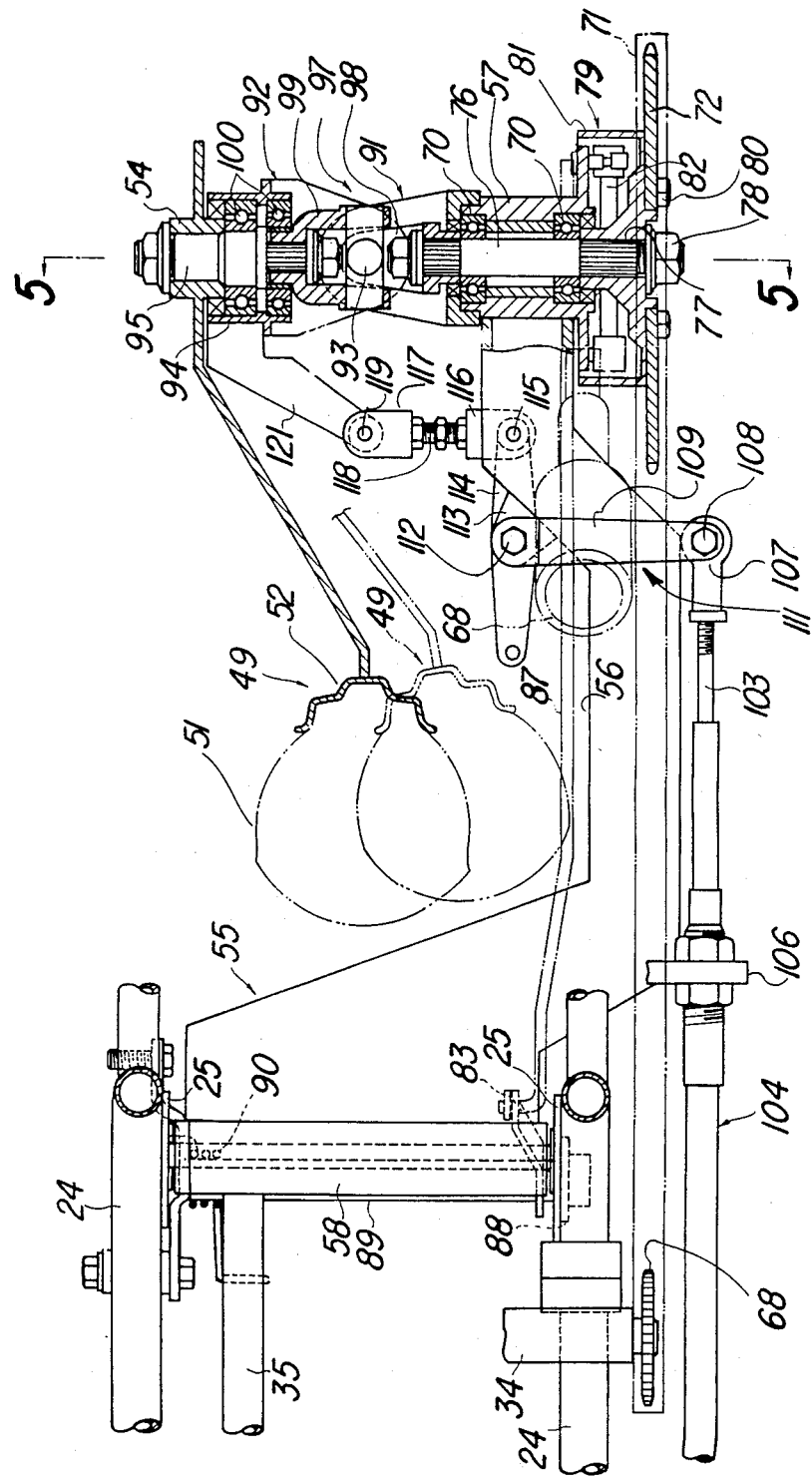
FIG. 4 is a top plan view, with portions broken away, of the rear portion of the construction shown in FIG. 3.
Figure 5:
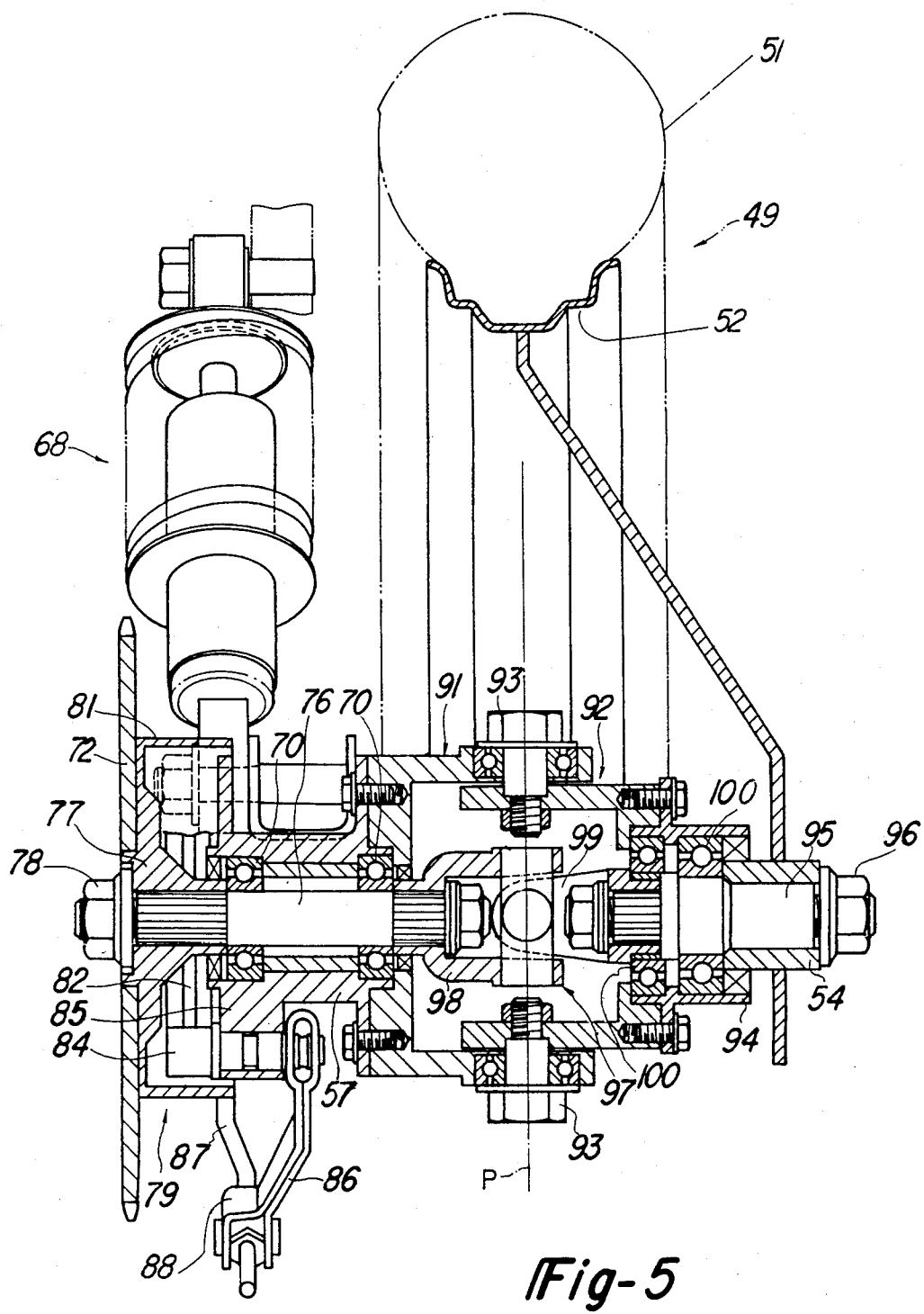
FIG. 5 is an enlarged cross-sectional view taken along the line 5—5 of FIG. 4.

The rear wheel 49 is supported for suspension movement relative to the frame 22 by means that include a trailing arm assembly, indicated generally by the reference numeral 55 and shown in more detail in FIGS. 3 and 4. Because of differences which will be described, the trailing arm assembly 55 includes one rearwardly extending arm portion 56 that lies on only one side of the rear wheel assembly 49 and which supports the rear wheel assembly by means of a hub carrier 57 that is fixed at its trailing end in a manner to be described. Forwardly of the rearwardly extending portion 56, the trailing arm 55 has a main portion 58 that extends substantially across the width of the motorcycle between the brackets 25. This portion is pivotally carried by the bracket 25 in a suitable manner for movement about an axis 59.

The suspension travel of the rear wheel 49 and trailing arm 55 are controlled by a combined coil spring and shock absorber unit 68 that is loaded between the rear end of the arm portion 56 and the frame 22 at a point contiguous to where the seat pillar 28 joins the seat rail 19.

The rear wheel 49 is driven and to this end a driving sprocket 69 is affixed to the engine transmission output shaft 34. A driving chain 71 encircles the sprocket 69 and a driven sprocket 72 that is affixed for rotation with the rear wheel 49 in a manner which will be described. A chain tensioner 73 is carried by the trailing arm 55 so as to maintain uniform tension on the driving chain 71 during its suspension movement.

In addition to being driven and supported for suspension movement, the rear wheel assembly 49 is also supported for steering movement by means of a steering support, indicated generally by the reference numeral 74. The steering support 74 is designed so as to provide a steering axis that passes through the transverse center of the rear wheel assembly 49 and which lies on a plane passing through the center of the motorcycle 21 and containing the front wheel steering axis. The rear wheel steering axis extends vertically at normal rider heights so that the contact point between the rear wheel 49 and the ground line lies at the point $A_1$.

The steering of the rear wheel 49 about the steering axis is controlled by means of a steering control mechanism, indicated generally by the reference numeral 75 which connects the front wheel steering mechanism with the rear wheel steering support mechanism 74 in a manner to be described.

Referring now primarily to FIGS. 1–5, the rear wheel steering support mechansim 74 will be described in detail. The hub carrier 57 has a pair of spaced apart bearings 70 that rotatably journal a shaft 76. The shaft 76 has a splined connected to a hub member 77 which is, in turn, affixed to the sprocket 72 by means of bolt assemblies 80. The sprocket 72 and hub member 77 are axially affixed to the shaft 76 by means of a nut 78.

The hub member 77 forms a portion of a drum brake assembly, indicated by the reference numeral 79. This drum brake assembly includes a brake drum 81 which is integrally formed with the hub member 77 and in which a pair of brake shoes 82 are supported. The brake shoes 82 are normally urged into engagement with a return steady rest pin carried in the hub carrier 57 and are actuated by means of an actuating cam 84 that is fixed to one end of a brake actuating shaft 85. Upon rotation of the brake actuating shaft 85 which is journaled in the hub carrier 57, the cam 84 will rotate and urge the brake shoes 82 outwardly into frictional engagement with the brake drum 81, in a known manner.

A brake actuating lever 86 is carried by the exposed end of the brake actuating shaft 85 and is connected to a flexible actuator 87 by means including a yoke and nut assembly. The forward end of the flexible transmitter 87 is connected to an actuating lever 83 which is pivotally supported on the frame assembly 21 by means of a bracket 88 and a pivot member 89 to which the lever 83 is connected which pivot member is rigidly connected to the brake pedal 35 and which is rotatable about the trailing arm pivot axis 59. A torsional spring 90 encircles the member 89 and has its ends in engagement with the brake pedal 35 and a fixed abutment so as to urge the brakes to a released position. When the brake pedal 35 is depressed, the member 89 and lever 83 will rotate so as to create a force on the actuator 87 to move it to pivot the lever 86 and actuate the rear drum brake 79 in the manner previously described.

The hub carrier 57 has affixed to it a bifurcated member 91 which, in turn, is pivotally connected to a second bifurcated member 92 by means of a pair of vertically disposed pivot pins 93. The pivot axis between the bifurcated members 91 and 92 defined by the pivot pins 93 lies on the steering axis of the rear wheel assembly 49 and also within the plane P.

The further bifurcated member 92 is affixed to a second hub carrier 94 which, in turn, journals a shaft 95 by means of a pair of spaced bearings 100. The shaft 95 is non-rotatably affixed to the rear wheel hub 54 by a splined connection and the hub 54 is held axially onto the shaft 95 by means of a retainer nut 96.

The shafts 76 and 95 are rotatably coupled by means of a universal joint 97 that has its respective yokes 98 and 99 affixed to the shafts 76 and 95 by means of retainer nuts. The universal joint 97 has its pivotal axis lying within the plane P on the steering axis of the rear wheel so that the steering movement of the rear wheel assembly 49 will not interfere with the driving forces transmitted to the rear wheel through the universal joint 97.

Figure 6:
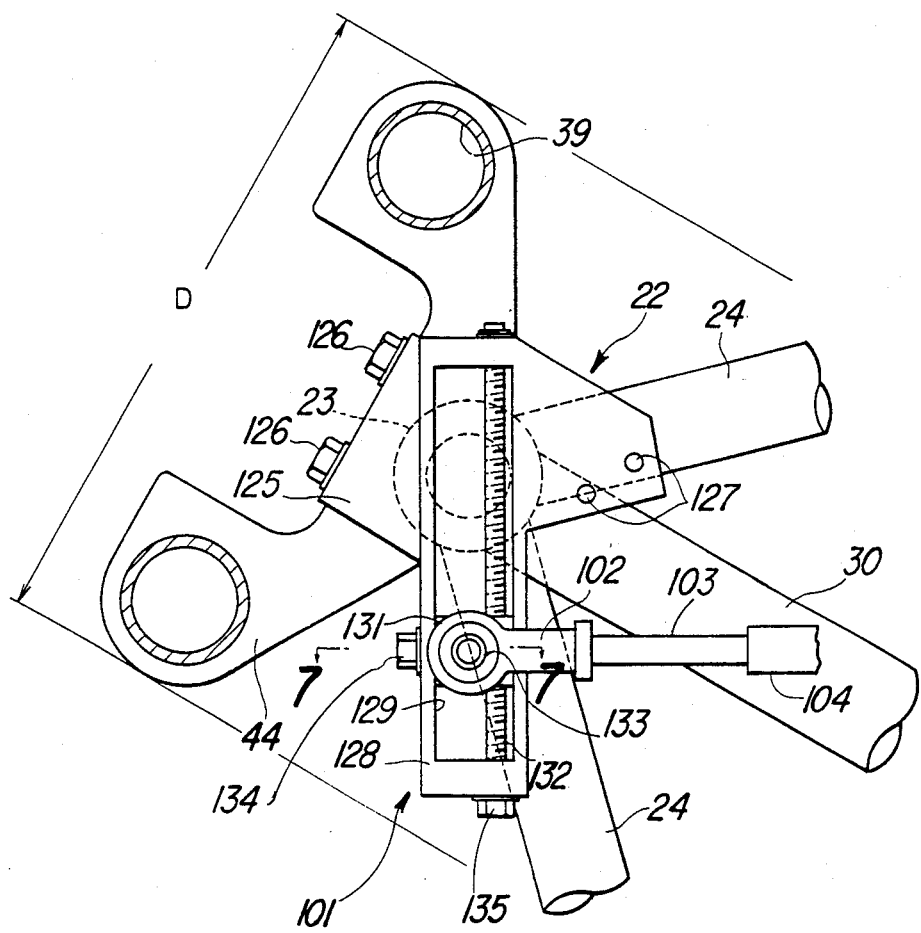
FIG. 6 is a view taken generally in the direction of the arrow 6 in FIG. 3, with portions shown in section.

The steering control mechanism 75 is provided for mechanically coupling the front wheel steering mechanism to the mechanism for steering the rear wheel 74 so that both wheels will be steered in unison and for permitting adjustment of the steering ratio between the front and rear wheels. This mechanism includes an adjustable connection, indicated generally as 101, (FIG. 6) between the lowermost fork bracket 44 and a trunion member 102. The trunion member 102 is connected to one end of a flexible transmitter 103 that is contained within a protective sheath 104. The adjacent forward end of the protective sheath 104 is carried by the down tube 24 and specifically by means of a bracket 105 that is connected to it.

The rear end of the protective sheath 104 is fixed adjustably to a bracket 106 carried by the trailing arm assembly 55. The rear end of the wire actuator 103 is connected by means of a trunion 107 and pivot pin 108 to one arm 109 of a bellcrank assembly 111. The bellcrank assembly 111 is supported for pivotal movement about a vertically extending axis by means of a pivot pin 112 that is carried by a bracket 113 that is affixed to the trailing arm portion 56. Another arm 114 of the bellcrank 111 is connected by means of a pivot pin 115 to a trunion 116. The trunion 116 is connected to a further trunion 117 by means of a turnbuckle assembly 118 so as to permit adjustment between the trunions 116 and 117. The trunion 117 is, in turn, connected by means of a pivot pin 119 to a steering arm 121 that is formed integrally with or affixed to the hub carrier 94.

The steering operation of this embodiment will now be described. If the rider steers the front wheel 37 to the right by rotating the handlebars 46 and front wheel 37 in a clockwise direction about the steering axis as viewed in FIG. 2 (counterclockwise as viewed in FIG. 6), there will be a force exerted on the flexible transmitter 103 to urge it in a rearward direction. This rearward movement places a force on the bellcrank 111 and specifically its arm 109 so as to urge it rearwardly in a counterclockwise direction about the pivot pin 112. The arm 115 then exerts a force through the turnbuckle 118 to the right as viewed in FIG. 4 so as to pivot the steering arm 112 and hub carrier 94 in a clockwise direction about the rear steering axis. Thus, both the front and rear wheels will be steered in the same direction. The mechanical arrangement of the linkage system is such, however, that the angle of steering movement of the rear wheel 49 will be less than the angle of steering movement of the front wheel 37 and as has been noted this ratio may be changed by the adjustable connection 101 now to be described by reference to FIGS. 6 and 7.

The adjustable connection 101 includes a bracket member 125 that is affixed to the lower steering fork plate 44 by means of threaded fasteners 126 and 127. The bracket member 125 has a generally rectangular shaped projection 128 in which a recess 129 is formed and slidably supported within the recess 129 is a block piece 131. The block piece 131 has a threaded opening that receives an elongated screw 132 that is journaled at its opposite ends in the member portion 128 in a suitable manner. The block piece 131 has affixed within it a pivot pin 133 that affords the connection to the trunion 102.

The block 131 is also provided with a transversely extending tapped opening into which a locking screw 134 is threaded. The locking screw 134 extends through an elongated slot formed in the member portion 128 which slot intersects the cavity 129.

The screw 132 is formed with a headed portion 135 so as to permit its rotation. As may be best seen in FIG. 6, the axial position of the block member 131 along the screw 132 will determine the degree of eccentricity between the steering axis of the front wheel and the pivot pin 133. This degree of eccentricity changes the ratio between the front and rear wheel steering because it changes the effective lever arm acting on the flexible transmitter 103. In fact, it should be seen from FIG. 6 that it is possible to achieve an overcenter relationship and this will in effect cause steering of the rear wheel in the opposite direction as the front wheel if the block 131 is displaced to the upper end of the slot 129 as viewed in FIG. 6. Hence, not only the ratio between the front and rear wheel steering may be adjusted but so may the actual steering relationship between the front and rear wheels with respect to the direction of rotation.

The steering ratio may be adjusted by loosening the bolt 134 and rotating the screw 132 by turning its headed portion 135. Since the block 131 cannot rotate, it will move axially along the screw 132 until the desired ratio position has been reached. At this time, the device may be locked in position by tightening of the nut 134.

Thus, it should be readily apparent that the ratio of steering between the front and rear wheels may be readily and quickly adjusted to suit the individual rider's preferences.

Because of the use of the flexible transmitter for transmitting the steering motion from the front to rear wheel, the suspension movement of the rear wheel 49 is easily accommodated and there will be no feedback or steering of the rear wheel 49 merely due to the suspension movement per se.

Because of the use of the single trailing arm rear suspension, the rear wheel 49 will circumscribe an arc as it moves relative to the frame assembly 22. As a result of this and in conventional motorcycles there will be some effective change in wheelbase during the suspension travel. This change in effective wheelbase can adversely affect handling, particularly when the rear wheel is steered as in this embodiment.

Figure 9:
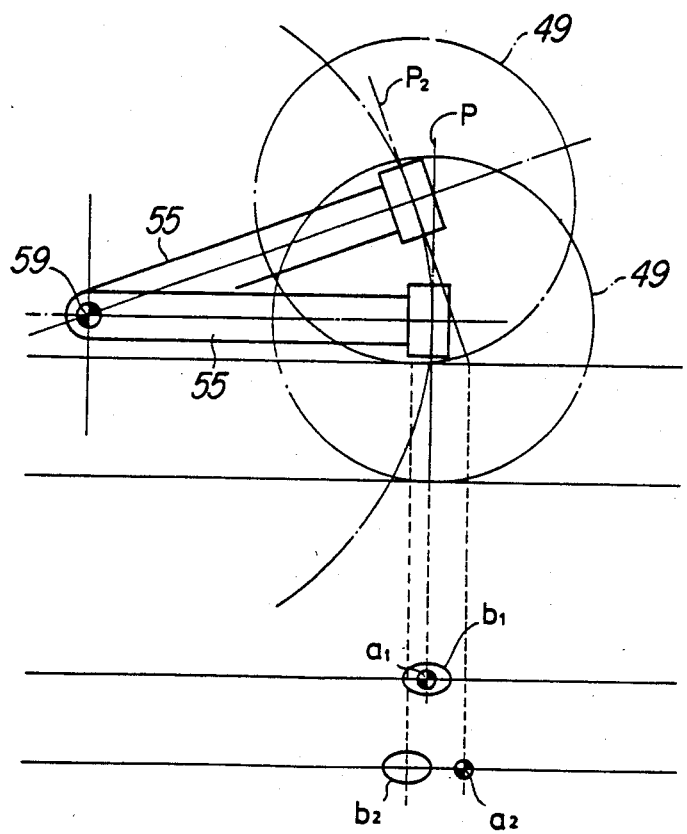
FIG. 9 is a schematic view, in part similar to FIG. 8, showing the suspension travel under acceleration or when encountering a bump.

In accordance with another feature of the invention, the caster angle for the rear wheel is chosen so that these wheelbase variations will be substantially minimized during suspension travel and the manner in which this is done may be best understood by reference to FIGS. 8 and 9.

FIG. 8 illustrates the normal road load condition wherein the suspension arm 55 extends horizontally and the steering axis P of the rear wheel extends vertically so that the tire has contact with the ground line along a patch centered at the point $A_1$ with the contact patch being indicated by area $B_1$.

When the vehicle rises relative to the rear wheel, as for example under braking, the trailing arm 55 will pivot to the position so that the axis P moves to the position $P_2$ and intersects the ground line at the angle $\alpha$. Normally this would mean that the point of contact of the rear wheel would move forwardly to the point $A_2$ and substantially shorten the wheelbase. However, because of the caster angle the point of contact of the wheel moves rearwardly to the contact patch $B_2$ so as to cause a very minor change in the effective wheelbase.

The same condition exists in connection with upward rear travel of the wheel 49 relative to the frame as shown in FIG. 9. When the rear wheel moves upwardly the arm 55 pivots in a counterclockwise direction and the steering axis assumes the position $P_2$. This would normally cause the contact patch to move rearwardly to the point $A_2$ and effectively increase the wheelbase of the vehicle. However, because of the caster angle the contact patch will actually move to the point $B_2$ which is only slightly forwardly of the normal contact patch and substantially no effective change in wheelbase will occur. Thus, it should be readily apparent that the described suspension system and arrangement of the caster angle ensures against any effective wheelbase changes during suspension travel.

It is to be understood that the foregoing description is that of the preferred embodiment of the invention and that various changes and modifications may be made without departing from the spirit and scope of the invention, as defined by the appended claims.

We claim:

1. A motorcycle having only one dirigible front wheel steered by an operator and only one rear wheel, the improvement comprising means for supporting said rear wheel for steering movement, means for mechanically coupling said front and said rear wheels for simultaneous steering movement, and means for adjusting the steering relationship between said front and rear wheels.

2. A motorcycle as set forth in claim 1 further including operator control means for steering the front wheel.

3. A motorcycle as set forth in claim 2 wherein the means for mechanically coupling the front and rear wheel couples the rear wheel steering mechanism to the front wheel steering mechanism and the means for adjusting the steering relationship comprises means for adjusting the ratio of the mechanical coupling.

4. A motorcycle as set forth in claim 3 wherein the coupling means comprises a linkage system and the means for adjusting comprises means for adjusting the effective length of one of said links.

5. A motorcycle as set forth in claim 4 wherein the front and rear wheels are supported for suspension movement.

6. A motorcycle as set forth in claim 4 wherein at least one of the steered wheels is driven.

7. A motorcycle as set forth in claim 6 wherein the front and rear wheels are supported for suspension movement.

8. A motorcycle as set forth in claim 7 wherein the rear wheel is the driven wheel.

9. A motorcycle as set forth in claim 4 wherein the linkage system comprises a first lever affixed to a fork of the front wheel, a flexible transmitter having a first end thereof adjustably connected to said first lever at a point adjustable relation to the steering axis of the front wheel, a bellcrank supported for pivotal movement relative to the rear wheel, the other end of said flexible transmitter being connected to one arm of said bellcrank for pivoting said bellcrank upon steering movement of said front fork, a steering arm affixed to the rear wheel and supporting the rear wheel for rotation about a rotational axis and for steering movement about a steering axis, and means for pivotally connected the other arm of the bellcrank to said rear wheel steering arm.

10. A motorcycle as set forth in claim 9 further including a universal joint for driving the rear wheel and having its axis aligned with the steering axis.

11. A motorcycle as set forth in claim 9 wherein the rear wheel is supported by means of a trailing arm having a first hub carrier affixed to the trailing arm and rotatably journaling a first shaft, a second hub carrier pivotally connected to said first hub carrier about the steering axis of the rear wheel, a second shaft journaled by said second hub carrier and rotatably coupled to the rear wheel and universal joint means interconnecting said first and second shafts for rotation, the universal joint means having its pivot axis lying in said rear wheel steering axis.

* * * * *